(12) United States Patent
Chapin, III

(10) Patent No.: US 6,196,678 B1
(45) Date of Patent: Mar. 6, 2001

(54) PROTECTIVE GLASSES WITH BUILT-IN CORRECTIVE LENSES

(76) Inventor: E. Barton Chapin, III, HC 33 Box 159, Bath, ME (US) 04530

( * ) Notice: Subject to any disclaimer, the term of this patent is extended or adjusted under 35 U.S.C. 154(b) by 0 days.

(21) Appl. No.: 09/370,834

(22) Filed: Aug. 9, 1999

(51) Int. Cl.[7] ................................................. G02C 7/10
(52) U.S. Cl. .................................. 351/44; 351/61; 351/41
(58) Field of Search ................................. 351/41, 44, 47, 351/54, 57, 61, 163, 164

(56) References Cited

U.S. PATENT DOCUMENTS

| | | | |
|---|---|---|---|
| 4,563,065 | 1/1986 | Kreissl | 351/57 |
| 4,717,249 | 1/1988 | Fischer | 351/43 |
| 5,153,619 | 10/1992 | Nix | 351/86 |
| 5,428,407 | 6/1995 | Sheffield | 351/58 |
| 5,608,470 | 3/1997 | Sheffield | 351/47 |
| 5,657,106 | 8/1997 | Herald, Jr. et al. | 351/57 |
| 5,790,227 * | 8/1998 | Rorabaugh | 351/54 |
| 5,790,230 | 8/1998 | Sved | 351/138 |
| 5,880,805 | 3/1999 | Naessens et al. | 351/47 |

* cited by examiner

*Primary Examiner*—Huy Mai
(74) *Attorney, Agent, or Firm*—Thomas L. Bohan; G. Mathew McCloskey

(57) ABSTRACT

Protective eyewear that incorporates standard near-point corrective lenses into a protective shield. The protective eyewear, which includes side-protective shields, is fabricated from lightweight, transparent impact-resistant material. The corrective lenses are incorporated in the lower portion of the shield, thereby leaving the upper, larger portion of the shield uncorrected and thus available for viewing distant objects. The corrective lenses provide a focal length within a range commonly associated with reading glasses.

15 Claims, 1 Drawing Sheet

PROTECTIVE GLASSES WITH BUILT-IN CORRECTIVE LENSES

BACKGROUND OF THE INVENTION

1. Field of the Invention

The present invention relates to protective eyewear. More specifically, the present invention relates to such eyewear satisfying eye-safety criteria set forth by the Occupational Safety and Health Administration (OSHA) and by the American National Standards Institute (ANSI). More specifically yet, the present invention relates to such eyewear, a part of which provides the user a visual correction and/or enhancement.

2. Description of the Prior Art

Traditionally, neither magnifiers or prescriptive lenses have been readily available for protective eyewear. Consequently, people using such protective eyewear often have to switch back and forth between their protective eyewear and their corrective eyewear to carry out their task. This is especially true for those persons needing near-point correction, the function of "reading glasses." As this practice of switching glasses is a continual nuisance, dangerous to the wearer, and explicitly against OSHA regulations in certain settings, there has been an increasing demand for protective eyewear for sports, welding, machine shop work, and the like, that meet the specific visual needs of the wearer, thus relieving the wearer of the need to continually switch glasses.

As stated, a set of "reading glasses" has as its function the correction of (or, better stated, compensation for) its user's near-point —definable as the closest point to a person's eyes to which an object can be brought and on which object the person is still able to focus his or her eyes. The ability to bring such things into focus depends on the ability of certain eye muscles to bring the radius of curvature of the eye's lens to a certain range; the closer the object to be focused, the smaller the lens' radius of curvature must be. Printed letters and numbers normally must be brought to within a reasonably close distance to a person's eyes in order to appear large enough to that person so that he or she is able to identify what is written. For the vast majority of people, including those requiring no visual correction in their younger years, the lessening flexibility of the eyes' lens with age means that most people reach a point of no longer being able to focus on objects at near distances. That is, the near-point recedes; as a result, text that once could be read without glasses appears blurred and is impossible to read. The near-point distance, which starts out at a couple of inches during childhood in one with normal eyes, eventually moves out to a distance of 30 or 40 inches, where it stabilizes.

Reading glasses have simple convex lenses that permit an object held near enough for reading to actually appear to the eye's focusing mechanism as lying out at or beyond the user's near-point. (One says that the lenses form an "image" at or beyond the user's near-point.) Simply stated, the lenses focus an image as if the image is at or beyond the near-point, yet the image has the apparent size associated with it being much closer. The lens equation is $(1/s)+(1/s')=1/f$, where $s$ is the distance of the object in front of the lens, $s'$ is the distance of the image behind the lens, and $f$ is the focal length of the lens. In the case of eyeglasses, the image will be on the same side of the lens as the object and hence will have a negative sign. Consider a person whose near-point is at a distance of 30". For reading, one typically holds the text about 10' in front of the eyes (taken to be at the same location as the eyeglasses). Thus, the lens formula for this person will take the form $(1/0")-(1/30")=1/f$ Solving the equation for "f" yields f=15". Thus, 15" is the focal length required of lenses to enable a person to focus properly on letters or small objects at a typical "reading" distance.

Reading glasses will "work" just as long as they focus the image at or beyond the person's near-point. Thus, there is no need for precision in this type of eye correction. Because of this and the near-universal need for reading glasses, reading glasses have become commodities purchasable off the rack in variety stores and drug stores. They are sorted by "strength." The lower the focal length, the higher the strength, thus stated because the lower the focal length, the farther in front of the lens the image is formed. A person whose near-point has moved a long ways out needs glasses of great strength, sometimes called by the misnomer "magnification." On the rack, the quantity used to characterize the different glasses is a diopter number (or diopters). The diopter number of a lens is the reciprocal of its focal length stated in meters. Thus, a lens with a focal length of 15" or about 0.4 m has a diopter number of 2.5. It is a lens with a refractive strength of 2.5 diopters.

The commodity nature of reading glasses and the fact that this is by far the most common type of corrective eyewear that persons engaged in activities needing eye protection require, strongly suggests combining the commodity constituting protective eyewear with the commodity constituting reading glasses. The prior art, however, for the most part is directed to introducing into protective eyewear visual corrections specific to the individual who will be using the protective eyewear.

Although Fischer (U.S. Pat. No. 4,717,249 Issued 1988) teaches the provision of a reading-glass type lens in connection with a diving mask, there are severe limitations on that device. The lens-device is a combination of a refracting surface and a prism, so that the user of the diving mask, by glancing at the corner of the mask whereon the lens-device is contained, is able to see a watch or other object that is not in the direct line of sight through the lens. The refractory surface of the object also allows the viewer to focus on the watch or other object in such a way as to read text on the object. The lens-prism in Fischer is attachable to a diving mask, as basically an after-added feature. Fischer does not suggest providing masks with a series of lens-prisms with different diopter values. Also, it appears inherent in the device of Fischer that the lens-prism must be quite small, indeed too small, to allow a user to do much with the lens-prism facility other than to quickly glance at an instrument reading or the like.

Nix (U.S. Pat. No. 5,153,619 Issued 1992) discloses flexible, adhesive lenses having the standard range of diopter values. More specifically, the "device" of Nix is a card containing a series of such flexible, transferrable lenses ("flexlenses"), the best use of which would probably be in a machine shop or welding establishment employing a number of workers using standard protective eye protection. Each worker then could select the lens "strength" best suited for his near-point correction and affix those lenses to the protective eyewear he was going to use. The Nix "flexlens" is intended for use on all protective eyewear. Apart from the impermanence of the correction, a serious drawback of the Nix device is that the user is left to correctly position it upon the protective eyewear. A misplaced or accidentally wrinkled "flexlens" will render the corrected portion of the protective eyewear useless, and, at the very least, will result in the transference procedure having to be re-done.

Sved (U.S. Pat. No. 5,790,230 Issued 1998) teaches an eyeglass assembly that combines sport or safety glasses with detachable prescription lenses. The Sved device incorporates a flexible nose bridge that secures the right and left prescription lenses, and that attaches to an existing eyeglass frame such that the device is located between the inside protective surface of the protective eyewear and the user's eyes. In addition to the fact that the Sved approach to the problem, using the dual glasses, can result in clumsy eyewear, the prescription-glasses protective-eyewear combination of Sved may internally shift position during use, forcing the user to continually remove the dual glasses for adjustment Therefore, what is needed is protective eyewear that incorporates in an integral way, the standard near-point corrective lens in such a manner that the user can alternately look at a distant object and at a dose-up object simply by slightly shifting the direction of his or her gaze. What is further needed is such protective eyewear having the corrective lenses set toward the lower portion of the eyewear, leaving the upper two-thirds of the user's field of vision protected but uncorrected. What is still further needed is such protective eyewear provided in a range of strengths similar to the strengths most common in reading glasses. Finally, what is needed is such protective eyewear that presents a cosmetically appealing appearance.

SUMMARY OF THE INVENTION

It is an object of the present invention to provide comfortable, lightweight protective eyewear to those people who require a corrective means to better view their task at hand. A further object of the present invention is to provide such protective eyewear that permanently incorporates a corrective means into the main protective shield of the eyewear, such that the corrective means is removed from the normal line of sight, and placed at the lower portion of the main protective shield, thereby leaving the majority and remainder of the field of vision unobstructed to the user. It is yet a further object of the present invention to provide such protective eyewear in a range of strengths that corresponds to the strengths commonly associated with reading glasses. Finally, it is an object of the present invention to provide such protective/corrective eyewear that is cosmetically appealing in appearance.

The device of the present invention relates to protective eyewear that permanently incorporates corrective lenses placed in the lower portion of the main protective shield of a standard set of safety glasses. The protective eyewear of the present invention eliminates the necessity of affixing adhesive type corrective lenses to protective glasses, as well as the use of combination devices that include cumbersome, ill-fitting assemblies. A near-sighted user will be able to wear the protective eyewear for a task requiring the use of safety glasses and be able to readily read fine print instructions or magnify detailed work by simply peering through the generously sized corrective lenses in the lower portion of the safety glasses. The user, simply by shifting his or her gaze through the upper portion of the glasses, can view distant objects unobstructed by the corrective lenses. This ability of the user to selectively view objects through the upper portion of the safety glasses or through the lower corrective portion eliminates the need and desire of the user to switch from safety glasses to reading glasses. Furthermore, such devices can be made available with corrective lenses of the standard strengths of reading glasses, and can be sold in local hardware, convenience, or home garden supply stores, making it convenient for the user to acquire protective/corrective eyewear when needed.

DETAILED DESCRIPTION OF THE INVENTION

Figure 1:
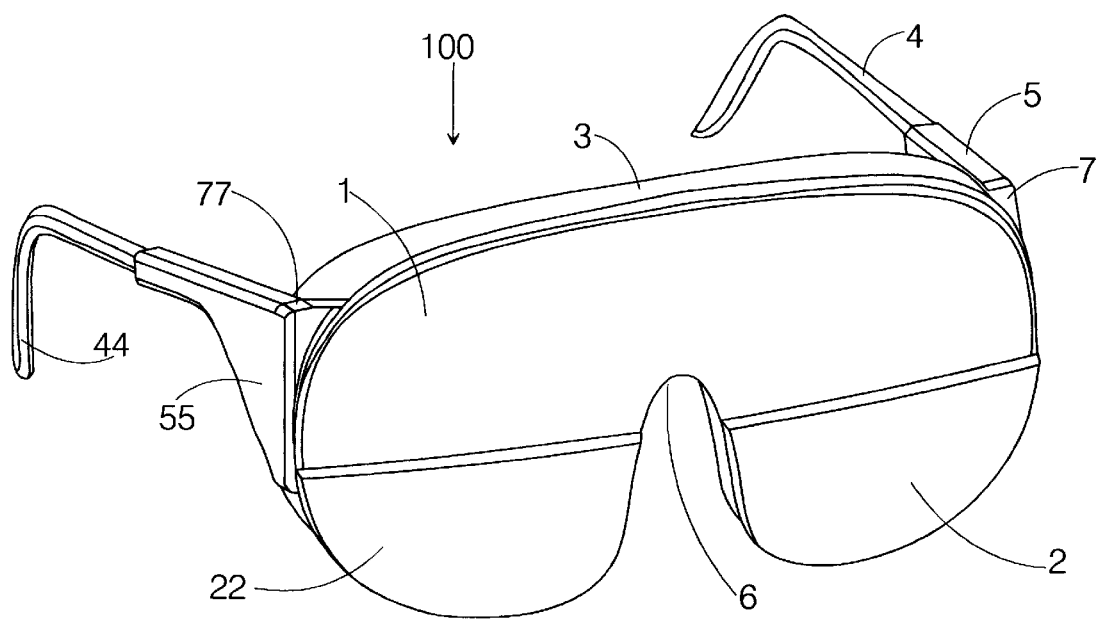
FIG. 1 is a front view of a particular embodiment of the present invention showing single-shield safety glasses that have permanently incorporated impact-resistant corrective lenses in the lower portions of the protective main shield.

A particular embodiment of the present invention is illustrated in FIG. 1, which shows a single-shield, protective eyewear 100 with a right corrective lens 2 and a left corrective lens 22 permanently molded into corresponding right and left lower portions of a main shield i of the protective eyewear 100. The main shield 1 and both corrective lenses 2 and 22 are constructed of a lightweight, sturdy, impact-resistant transparent material that satisfies the eye-safety requirements of the American National Standards Institute. The protective eyewear 100 is also equipped with a right side-protective shield 5 and a left side-protective shield 55 made from the same material as the main shield 1. A brow bar 3 extends across the top of the protective eyewear 100 and engages the wearer's face in use. Extending backwards from opposite ends of the brow bar 3 are a right temple 4 and a left temple 44. As can be seen in FIG. 1, the right temple 4 includes the right side-protective shield 5 and is attached to right side of the main shield 1 just behind the brow bar 3 via a right hinge 7. Analogously, the left temple 44 includes the left side-protective shield 55 and is attached to the left side of the main shield 1 just behind the brow bar 3 via a left hinge 77. The hinges 7, 77 are conventional hinges known in the field of eyewear. In the Preferred Embodiment, each temple 4, 44 is able to be folded inward and behind the main shield 1 for storage when the protective eyewear 100 is not in use. Finally, the main shield 1 is formed with an inverted v-shape at the bottom center of the device so as to define a nose bridge 6.

Figure 2:
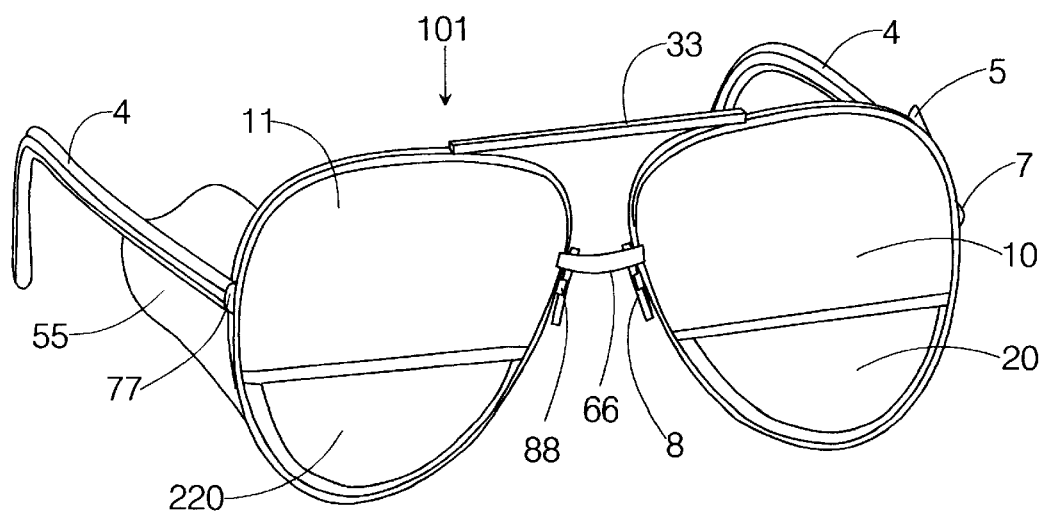
FIG. 2 is a front view of an alternate embodiment of the present invention showing safety glasses that have individual protective shields for the right and left eye, respectively, with an impact-resistant corrective lens permanently incorporated in the lower portion of each shield.

An alternate embodiment of the present invention is displayed in FIG. 2, which shows a protective eyewear 101 with a right corrective means 20 and a left corrective means 220 embedded in the lower portion of a right protective eye shield 10 and a left protective eye shield 11, respectively. This protective eyewear 101 is made of similar material to that of the Preferred Embodiment previously described in FIG. 1, but is constructed to be more similar to traditional reading glasses. A brow bar 33 and a nose bridge 66 are more defined in this alternate embodiment so as to connect and stabilize the individual right protective eye shield and left protective eye shield 10 and 11 respectively. Furthermore, a left nose pad 88 and a right nose pad 8 are provided that are adjustable so as to provide a better fit for the user of the protective eyewear 101.

The aforementioned embodiments of the present invention should be considered merely illustrative. As numerous modifications and changes will readily occur to those skilled in the art, it is not desired to limit the invention to the exact construction shown and described herein. Accordingly, all suitable modifications may serve a particular purpose while still employing the unique concepts set forth in the SUMMARY.

I claim:

1. A protective eye-wear device comprising:
   a single-piece, protective eye-shield that includes at least one vision-correcting portion, said protective eye-shield being adapted to fit a person's head, said single-piece, protective eye-shield having a left-half and a right-half, said at least one vision-correcting portion being constructed from the same piece of material as said single-piece, protective eye-shield, whereby said at least one vision correcting portion is integral with said single-piece, protective eye-shield; and a right temple and a left temple, said right temple being attached to said right-half, said left temple being attached to said left-half, said right temple and said left temple each having a protective side-shield.

2. The device as described in claim 1 wherein said single-piece, protective eye-shield is made by the method of injection-molding and wherein said vision-correcting portion is shaped so as to provide a near-point corrective lens.

3. The device in claim 2 wherein said at least one vision-correcting portion has a focal length selected from a range of common focal-length values for reading-glasses.

4. The device as described in claim 2 wherein said protective eye shield, said right side-protective shield, said left side-protective shield, and said near-point corrective lens are made of a transparent impact-resistant material.

5. The device as described in claim 4 wherein said transparent impact-resistant material is tinted.

6. The device as described in claim 4 wherein said transparent impact-resistant material is a polycarbonate material.

7. The device as described in claim 3 wherein said range of focal-length values extends between about 5 inches and about 40 inches.

8. The device as described in claim 1 wherein said single-piece, protective eye-shield is made by the method of cast-molding and wherein said vision-correcting portion is shaped so as to provide a near-point correction.

9. A protective eye-wear device comprising:

a right eye-shield said right eye-shield having a vision-correcting means integrally incorporated therewithin; a left eye-shield, said left eye-shield having a vision-correcting means integrally incorporated therewithin;

a right temple and left temple, said right temple and said left temple each having a protective side-shield; and a nose bridge, said nose bridge coupling said right eye-shield to said left eye-shield.

10. The device as described in claim 9 wherein said left eye-shield and said right eye-shield are made by the method of casting and wherein said vision-correcting means comprises a near-point corrective lens.

11. The device of claim 10 wherein said vision-correcting means has a focal length between 6 inches and 40 inches.

12. The device as described in claim 10 wherein said right protective eye shield, said left protective eye shield, said right side-protective shield, said left side-protective shield, and said vision-correction means are made of transparent impact-resistant material.

13. The device as described in claim 12 wherein said transparent impact-resistant material is tinted.

14. The device as described in claim 12 wherein said transparent impact-resistant material is a polycarbonate material.

15. The device as described in claim 9 further comprising a right nose pad and a left nose pad, said right nose pad and said left nose pad being adjustable so as to conform in shape to said user's nose.

\* \* \* \* \*